United States Patent [19]
Petzl

[11] Patent Number: 5,357,657
[45] Date of Patent: Oct. 25, 1994

[54] KARABINER FOR CLIMBING AND POTHOLING

[75] Inventor: Paul Petzl, Barraux, France
[73] Assignee: Zedel, Crolles, France
[21] Appl. No.: 166,941
[22] Filed: Dec. 15, 1993

[30] Foreign Application Priority Data
Jan. 11, 1993 [FR] France .............. 93 00214

[51] Int. Cl.$^5$ .............................................. A44B 13/00
[52] U.S. Cl. .................... 24/599.9; 24/573.5; 24/599.1
[58] Field of Search ............... 24/599.9, 599.1, 573.5, 24/600.1, 600.7, 601.5

[56] References Cited
U.S. PATENT DOCUMENTS

| | | | |
|---|---|---|---|
| 4,095,316 | 6/1978 | Gabriel | 24/599.1 |
| 4,819,304 | 4/1989 | Engers | 24/573.5 |
| 4,835,823 | 6/1989 | Contat | 24/573.5 |
| 4,930,194 | 6/1990 | Frechin | 24/599.9 |

Primary Examiner—Victor N. Sakran
Attorney, Agent, or Firm—Stevens, Davis, Miller & Mosher

[57] ABSTRACT

A karabiner comprises a C-shaped body having a male part composed of a central tab and of a terminal protuberance in the form of a cap, and a pivoting finger equipped with a female part having a first orifice for access to an internal recess for accommodation of the male part when the finger is closed. A second outlet orifice is arranged in the finger opposite the first orifice, to ensure removal of the mud to the outside, and self-cleaning of the locking zone inside the recess. The protuberance is arranged as a fixed piston bounding a compressible volume open on the side where the second orifice is situated.

8 Claims, 2 Drawing Sheets

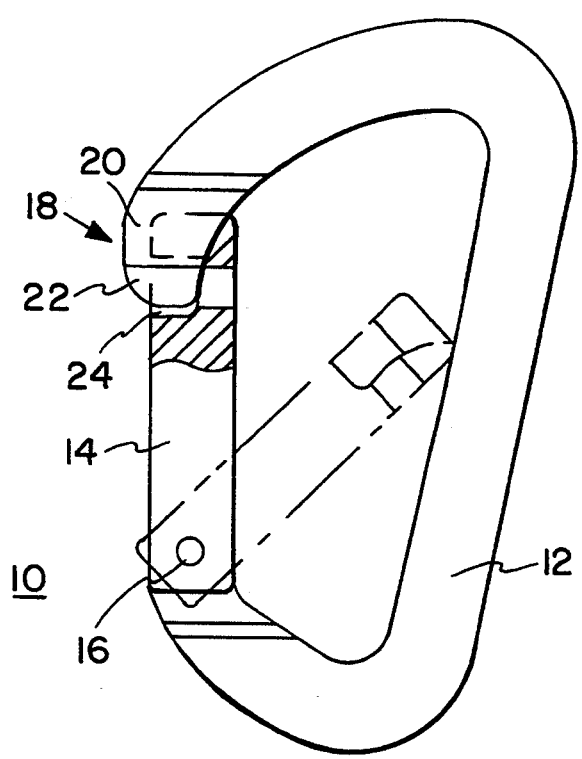
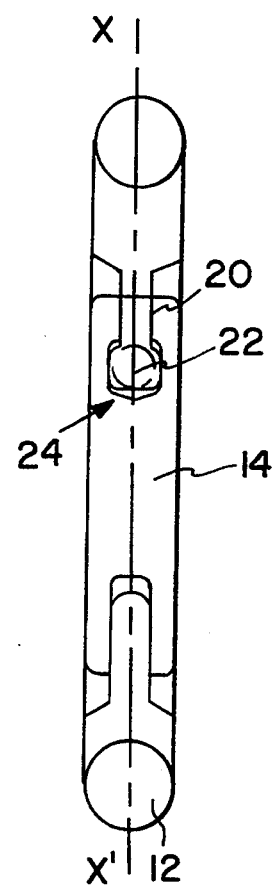
FIG. 1  FIG. 2
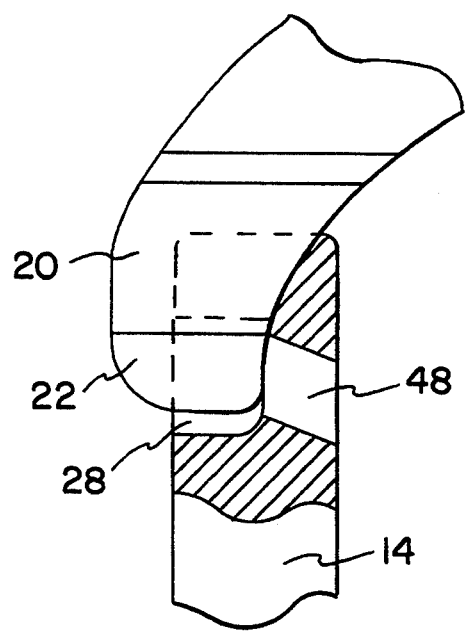
FIG. 7

KARABINER FOR CLIMBING AND POTHOLING

BACKGROUND OF THE INVENTION

The invention relates to a karabiner, notably for climbing and potholing, comprising:
- a C-shaped body, and a movable finger pivotally mounted on a spindle supported by one of the ends of the body,
- a male part at the other end of the body, having a transverse cross-section in the shape of a reverse T, composed of a central tab associated with a terminal protuberance in the form of a cap,
- a female part arranged in the finger opposite the spindle, and having a first front orifice for access to an internal recess to accommodate the protuberance, and a central notch extending the first orifice towards the apex of the finger to accommodate the tab,
- and an internal stop of the female part coming into engagement with the conjugate edge of the male part in the closed position of the finger.

A karabiner of this kind is described in the document EP-A-289,490, and has a good mechanical breaking strength able to withstand high tensile forces. The female part does not have any outlet so as to form an end of travel stop. In the event of the karabiner being used in a snowy or muddy environment, the problem of ice or dirt building up in the recess of the female part however arises. Progressive clogging of the recess is liable to affect the mechanical strength of the karabiner, depending on how far the locking zone between the male and female parts is degraded.

SUMMARY OF THE INVENTION

The object of the invention consists in improving the safety of a karabiner whatever the surrounding environment.

The karabiner according to the invention is characterized in that the finger comprises in addition a second rear outlet orifice making the internal volume of the recess communicate with the outside environment, on the opposite side from the first orifice, and that the second outlet orifice is appreciably facing the protuberance at the end of closing travel of the finger to ensure removal of the mud to the outside, and self-cleaning of the locking zone inside the recess.

According to one feature of the invention, the protuberance comprises a first latching surface constituting said locking zone with the female part, and a second surface arranged as a fixed piston bounding a compressible volume when the bottom of the recess is moved progressively towards the protuberance, said compressible volume being open on the side where the second outlet orifice is situated.

According to another feature, the internal stop of the female part has a convex surface cooperating in the closed position with a conjugate concave surface of the edge of the tab, the reaction of the stop on the edge forming an acute angle A with the axis YY' of the recess.

The second outlet orifice may be of any shape, and its size may be the same as or smaller than that of the first access orifice.

BRIEF DESCRIPTION OF THE DRAWINGS

Other advantages and features will become more clearly apparent from the following description of an illustrative embodiment of the invention, given as a non-restrictive example only and represented in the accompanying drawings, in which:

FIG. 1 is a schematic elevational view of a karabiner according to the invention, the locking zone being represented in partial cross-section;

FIG. 2 shows a side view of the karabiner of FIG. 1;

FIG. 7 is an identical view to FIG. 3 of another alternative embodiment.

DESCRIPTION OF THE PREFERRED EMBODIMENT

Figure 3:
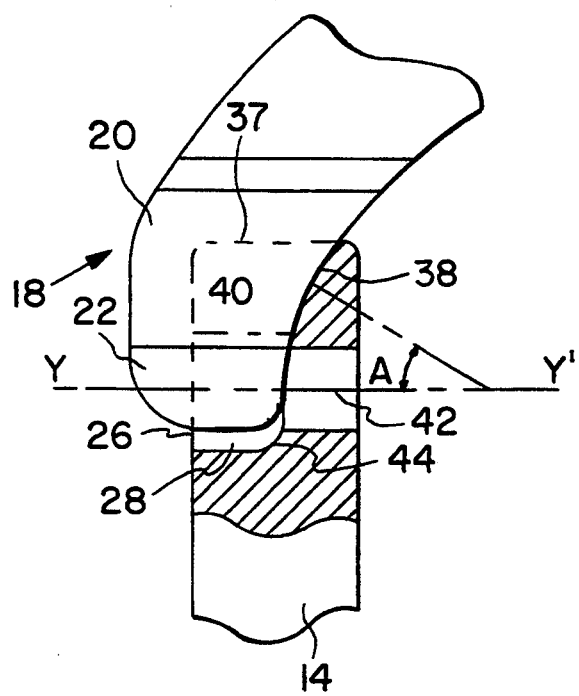
FIG. 3 is a partial view on an enlarged scale of the locking zone of the karabiner of FIG. 1.
Figure 4:
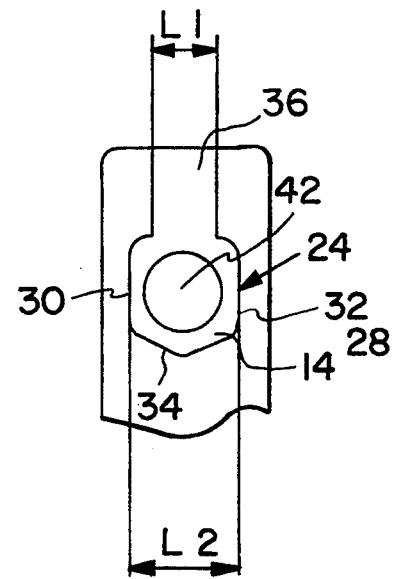
FIG. 4 is a right-hand side view of FIG. 3 representing the female part of the finger.

In FIGS. 1 to 4, a karabiner 10 for climbing and potholing comprises a fixed C-shaped body 12, and a movable finger 14 of cylindrical cross-section pivotally mounted on a spindle 16 supported by the bottom end of the body 12. The finger 14 is movable by an action pushing the body 12 inwards to occupy a separated position (in broken line in FIG. 1), allowing opening of the karabiner 10 for insertion of a safety rope or strap. A return spring (not represented) is arranged inside the finger 14, and urges the latter in the opposite direction to a closed position (unbroken line in FIG. 1) so as to come into engagement with the top end of the body 12.

The top end of the body 12 comprises a male part 18 having a transverse cross-section in the shape of a reverse T extending in the trace plane XX' on the body 12. The male part 18 is composed of a central tab 20 terminated by an enlarged protuberance 22 in the form of a cap. The terminal protuberance 22 has a total width greater than that of the tab 20, but smaller than the diameter of the shaped section constituting the rest of the body 12.

The finger 14 is equipped opposite the spindle 16 with a female part 24 having a conjugate shape to the male part 18. The female part 24 comprises a first front orifice 26 for access to an internal recess 28, which is bounded by two parallel side faces 30, 32, joined together by a bottom 34 in the form of an arch.

Opposite the bottom 34, the faces 30, 32 converge towards a central notch 36 which is extended in the diametral plane towards the apex 37 of the finger 14.

The width L1 of the notch 36 is on the one hand slightly greater than the thickness of the tab 20 of the male part 18, and on the other hand smaller than the distance L2 between the two side faces 30, 32. This results in a peripheral clearance enabling the female part 24 to be fitted onto the male part 18 when the finger 14 is closed.

The depth of the recess 28 accommodating the protuberance 22 is defined by an internal stop 38, having a curved profile for linking with the notch 36 at the level of the apex 37 of the finger 14.

The stop 38 has a convex surface cooperating with a conjugate concave shape of the internal edge 40 of the tab 20.

To enable mud, snow or other particles accumulated in the recess 28 of the female part 24 to be removed, the finger 14 comprises in addition a second rear outlet orifice 42, making the inside of the recess 28 communicate with the outside environment, on the opposite side from the front orifice 26, i.e. towards the inside of the body 12. According to FIGS. 3 and 4, the second outlet orifice or hole 42 is of slightly smaller size than that of the recess 28. An intermediate bevel 44 provides an internal link between the recess 28 and hole 42, which are appreciably aligned according to a direction YY' perpendicular to the finger 14.

It can be noted that the reaction of the stop 38 on the concave internal edge 40 of the tab 20 in the closed position of the karabiner 10 forms an acute angle A with the axis YY' of the recess 28 and hole 42. Progressive moving of the bottom of the recess 28 towards the protuberance 22 of the male part 18 bounds a compressible volume open on the side where the outlet hole 42 is situated.

The protuberance 22 forms a fixed piston, and the mud particles are removed automatically via the cylindrical hole 42 to the outside. The internal volume of the recess 28 remains permanently clean, enabling the stop 38 to come into engagement against the conjugate edge 40 of the tab 20 under all environmental conditions. The internal locking zone between the male and female parts 18, 24 is optimum, which guarantees the safety of the karabiner 10.

Figure 5:
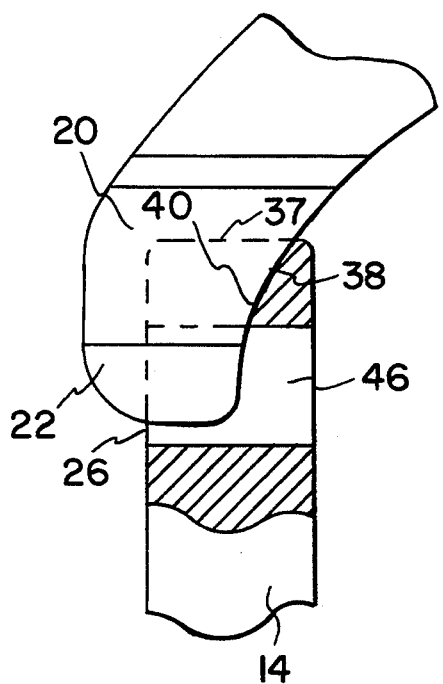
FIG. 5 and 6 are identical views respectively to FIGS. 3 and 4 of an alternative embodiment.
Figure 6:
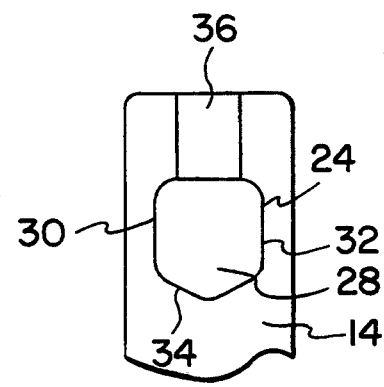

According to the alternative embodiment of FIGS. 5 and 6, the outlet hole 46 is arranged in the extension of the recess 28, and has the same shape as the access orifice 26.

According to FIG. 7, the outlet hole 48 is inclined downwards with respect to the recess 28.

In the three embodiments, the outlet hole 42, 46, 48 is arranged facing the protuberance 22 when the finger 14 reaches the end of closing travel. Such an arrangement enables efficient removal of the mud to the outside, and self-cleaning of the locking zone of the karabiner.

It is obvious to modify the shape, and location of the outlet hole without departing from the scope of the invention. The male and female parts of the karabiner could also be inverted.

The karabiner 10 is made of an aluminum-based material.

I claim:

1. A karabiner, notably for climbing and potholing, comprising:
    a C-shaped body, and a movable finger pivotally mounted on a spindle supported by one of the ends of the body,
    a male part at the other end of the body, having a transverse cross-section in the shape of a reverse T, composed of a central tab associated with a terminal protuberance in the form of a cap,
    a female part arranged in the finger opposite the spindle, and having a first front orifice for access to an internal recess to accommodate the protuberance, and a central notch extending the first orifice towards the apex of the finger to accommodate the tab,
    and an internal stop of the female part coming into engagement with the conjugate edge of the male part in the closed position of the finger, wherein the finger comprises in addition a second rear outlet orifice making the internal volume of the recess communicate with the outside environment, on the opposite side from the first orifice, and the second outlet orifice is appreciably facing the protuberance at the end of closing travel of the finger to ensure removal of the mud to the outside, and self-cleaning of the locking zone inside the recess.

2. The karabiner according to claim 1, wherein the protuberance comprises a first latching surface constituting said locking zone with the female part, and a second surface arranged as a fixed piston bounding a compressible volume when the bottom of the recess is moved progressively towards the protuberance, said compressible volume being open on the side where the second outlet orifice is situated.

3. The karabiner according to claim 1, wherein the internal stop of the female part has a convex surface cooperating in the closed position with a conjugate concave surface of the edge of the tab, the reaction of the stop on the edge forming an acute angle with the axis of the recess.

4. The karabiner according to claim 1, wherein the second outlet orifice is arranged in alignment with the recess.

5. The karabiner according Go claim 4, wherein the second outlet orifice has a shape appreciably the same as that of the first access orifice.

6. The karabiner according to claim 4, wherein the second outlet orifice has a size smaller than that of the recess, a bevel being arranged in the joining zone between the recess and said second orifice.

7. The karabiner according to claim 7, wherein the second orifice is cylindrical.

8. The karabiner according to claim 1, wherein the second outlet orifice is inclined downwards with respect to the axis of the recess.

* * * * *